United States Patent
Song et al.

(10) Patent No.: US 11,115,099 B2
(45) Date of Patent: *Sep. 7, 2021

(54) SYSTEM AND METHOD FOR SUPPORTING ANTENNA BEAMFORMING IN A CELLULAR NETWORK

(71) Applicant: Apple Inc., Cupertino, CA (US)

(72) Inventors: Yi Song, Plano, TX (US); Lai King Tee, San Jose, CA (US); Jun Li, Richardson, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,192

(22) Filed: May 7, 2020

(65) Prior Publication Data

US 2020/0266871 A1    Aug. 20, 2020

Related U.S. Application Data

(63) Continuation of application No. 16/289,783, filed on Mar. 1, 2019, now Pat. No. 10,686,510, which is a
(Continued)

(51) Int. Cl.
*H04B 7/00* (2006.01)
*H04B 17/00* (2015.01)
(Continued)

(52) U.S. Cl.
CPC ......... *H04B 7/0632* (2013.01); *H04B 7/0408* (2013.01); *H04B 7/0617* (2013.01);
(Continued)

(58) Field of Classification Search
CPC .. H04B 7/0639; H04B 7/0695; H04B 7/0632; H04B 7/0617; H04B 7/0469;
(Continued)

(56) References Cited

U.S. PATENT DOCUMENTS 6,072,788 A    6/2000  Peterson et al.
6,141,335 A   10/2000  Kuwahara et al.
(Continued)

FOREIGN PATENT DOCUMENTS

CN        1582043      2/2005
CN      101171781      4/2008
(Continued)

OTHER PUBLICATIONS

U.S. Appl. No. 12/990,989, filed Nov. 4, 2010, Yi Song.
(Continued)

*Primary Examiner* — Allahyar Kasraian
(74) *Attorney, Agent, or Firm* — Kowert, Hood, Munyon, Rankin & Goetzel, P.C.

(57) ABSTRACT

The present invention is a method and system for supporting a beamforming antenna system in a mobile broadband communication network with an improved beam pattern, beam sweep pattern, pilot channel design with feedback and reporting rules, and control signaling design. Specifically, the improved beam pattern includes a method of supporting wireless communications in a wireless network forming at least two spatial beams within a cell segment where the at least two spatial beams are associated with different power levels, and separately, where at least two spatial beams can be moved across the cell segment according to a unique sweep pattern. The pilot channel design improves network bandwidth performance and improves user mobility tracking. Feedback and reporting rules can be established using a particular field designator, CQI, in the preferred embodiment.

20 Claims, 11 Drawing Sheets

Related U.S. Application Data continuation of application No. 15/969,108, filed on May 2, 2018, now Pat. No. 10,263,683, which is a continuation of application No. 15/590,151, filed on May 9, 2017, now Pat. No. 9,985,710, which is a continuation of application No. 14/289,723, filed on May 29, 2014, now Pat. No. 9,680,536, which is a continuation of application No. 12/990,989, filed as application No. PCT/US2009/002866 on May 8, 2009, now Pat. No. 8,750,933.

(60) Provisional application No. 61/052,011, filed on May 9, 2008.

(51) Int. Cl.
| | |
|---|---|
| *H04W 72/08* | (2009.01) |
| *H04B 7/06* | (2006.01) |
| *H04W 52/32* | (2009.01) |
| *H04B 7/0408* | (2017.01) |
| *H04L 5/00* | (2006.01) |

(52) U.S. Cl.
CPC ......... *H04B 7/0639* (2013.01); *H04B 7/0695* (2013.01); *H04L 5/0057* (2013.01); *H04W 52/325* (2013.01)

(58) Field of Classification Search
CPC .... H04B 7/0641; H04B 7/088; H04B 7/0619; H04L 5/0057; H04L 25/03828; H04L 1/0026; H04L 5/0048; H04L 5/006; H04W 52/325; H04W 72/1226; H04W 28/18; H04W 16/28; H04W 24/00; H04W 72/1231; H04W 72/04; H04W 28/0268; H04W 72/1278; H04W 74/00; H04W 72/14; H04W 88/08

See application file for complete search history.

(56) References Cited

U.S. PATENT DOCUMENTS

| | | | |
|---|---|---|---|
| 7,206,608 B1 | 4/2007 | Wu et al. | |
| 7,236,478 B2 | 6/2007 | Wu et al. | |
| 7,986,972 B2 | 7/2011 | Kim et al. | |
| 8,200,286 B2 | 6/2012 | Molnar et al. | |
| 2001/0034236 A1 | 10/2001 | Tong et al. | |
| 2003/0008654 A9 | 1/2003 | Senarath et al. | |
| 2004/0213187 A1 | 10/2004 | Fujil | |
| 2004/0218569 A1 | 11/2004 | Pedersen et al. | |
| 2004/0224637 A1 | 11/2004 | Silva et al. | |
| 2005/0272472 A1 | 12/2005 | Goldberg et al. | |
| 2006/0233131 A1 | 10/2006 | Gore et al. | |
| 2007/0049218 A1 | 3/2007 | Gorokhov et al. | |
| 2007/0097910 A1 | 5/2007 | Ji et al. | |
| 2007/0099578 A1 | 5/2007 | Adeney et al. | |
| 2007/0213001 A1 | 9/2007 | Kim et al. | |
| 2007/0213011 A1 | 9/2007 | Kim et al. | |
| 2007/0260956 A1* | 11/2007 | Terry | H04B 7/0632 714/748 |
| 2008/0144737 A1 | 6/2008 | Naguib | |
| 2008/0165872 A1* | 7/2008 | Kwon | H04L 25/03343 375/260 |
| 2008/0194204 A1 | 8/2008 | Duet et al. | |
| 2008/0318606 A1 | 12/2008 | Tsutsui et al. | |
| 2009/0225728 A1 | 9/2009 | Tao et al. | |
| 2009/0258654 A1 | 10/2009 | Hagerman | |
| 2009/0318157 A1 | 12/2009 | Hoshino et al. | |
| 2011/0038308 A1 | 2/2011 | Song et al. | |
| 2011/0039543 A1 | 2/2011 | Tee et al. | |

FOREIGN PATENT DOCUMENTS

| | | |
|---|---|---|
| EP | 1 865 642 A1 | 12/2007 |
| JP | 2001127699 | 5/2001 |
| JP | 2003283394 | 10/2003 |
| JP | 2004297750 | 10/2004 |
| JP | 2006005908 | 1/2006 |
| JP | 2006211366 | 8/2006 |
| JP | 2006270216 | 10/2006 |
| KR | 1020050053787 | 6/2005 |
| WO | 2004039011 | 5/2004 |
| WO | 2006113872 | 10/2006 |
| WO | 2007088624 | 8/2007 |
| WO | 2007088624 A1 | 8/2007 |
| WO | 2007/113923 | 10/2007 |
| WO | 2008050745 | 5/2008 |
| WO | 2009046409 | 4/2009 |

OTHER PUBLICATIONS

"On 2-Tx Codebook Subset Selection," Nortel, 3GPP TSG-RAN WG1 #53, R1-082056, May 5-9, 2008, pp. 1-4.
First Office Action and translation thereof in Chinese Application No. 200980126234.8, dated Mar. 1, 2013, pp. 1-19.
Office Action from Japanese Patent Application No. 2011-508515, dated Jun. 5, 2013, (English Translation and Japanese Versions), pp. 1-5.
3rd Generation Partnership Project 2, "Physical Layer for Ultra Mobile Broadband (UMB) Air Interface Specification", Aug. 2007, pp. i to 5-18.
Office Action for Japanese Patent Application No. 2015-095217, dated Jun. 20, 2016, pp. 1-6.
U.S. Appl. No. 60/977,425, filed Oct. 4, 2007, Yi Song.
Notice of Allowance from Japanese Application No. 2011508515, dated Mar. 31, 2015, Korean version, pp. 1-3.
Office Action from Korean Application No. 1020147013561, dated Apr. 9, 2015, English and Korean versions, pp. 1-9.
Extended European Search Report for European Patent Application No. 09743079.7, dated Jan. 31, 2017, pp. 1-9.
Office Action for Chinese Patent Application No. 201410361581.1, dated Jan. 23, 2017, pp. 1-16.
Robert Novak et al.: "Proposal for IEEE 802.16m SDMA and Beamforming; C80216m-08_345", vol. 802.16m, May 5, 2008, pp. 1-19.
Nortel: "Beam Design in Opportunistic Space Time Multiple Access", 3GPP2-Drafts, May 11, 2007, pp. 1-11.
Office Action for Chinese Patent Application No. 201410361122.3, dated Jan. 5, 2017, pp. 1-9.
The title page and pp. 4-19 through 4-25 of 3GPP2 C.S0084-001-0, Version 2.0, "Physical Layer for Ultra Mobile Broadband (UMB) Air Interface Specification", Aug. 2007 available via the Internet at http://www.3gpp2.org/public_html/specs/c.s0084-001-0_v2.0_070904.pdf.
Office Action, Application No. 2015-095217, dated May 24, 2017, 3 pages.
India Examination Report for Patent Application No. 201848036389; dated Oct. 31, 2020; 6 Pages.

\* cited by examiner

F-CPICH OF BEAM POSITIONS 1, 2, 3, AND 4 IN MUX MODE 1

SYSTEM AND METHOD FOR SUPPORTING ANTENNA BEAMFORMING IN A CELLULAR NETWORK

RELATED APPLICATION DATA

This application is a continuation of U.S. patent application Ser. No. 16/289,783, filed on Mar. 1, 2019, which is a continuation of U.S. patent application Ser. No. 15/969,108 filed on May 2, 2018 (now U.S. Pat. No. 10,263,683), which is a continuation of U.S. patent application Ser. No. 15'/590,151 filed on May 9, 2017 (now U.S. Pat. No. 9,985,710), which is a continuation of U.S. patent application Ser. No. 14/289,723 filed on May 29, 2014 (now U.S. Pat. No. 9,680,536), which is a continuation of U.S. patent application Ser. No. 12/990,989 filed on Nov. 4, 2010 (now U.S. Pat. No. 8,750,933), which claims the benefit of and is a National Phase Entry of International Application No. PCT/US2009/002866, filed on May 8, 2009, which claims the benefit of Provisional Patent Application Ser. No. 61/052,011 filed on May 9, 2008, which are hereby incorporated by reference into this utility patent application.

TECHNICAL FIELD OF THE INVENTION

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

BACKGROUND OF THE INVENTION

There is an increasing demand on mobile wireless operators to provide voice and high-speed data services, and at the same time, these operators want to support more users per basestation to reduce overall network costs and make the services affordable to subscribers. As a result, wireless systems that enable higher data rates and higher capacities are needed. The available spectrum for wireless services is limited, however, and the prior attempts to increase traffic within a fixed bandwidth have increased interference in the system and degraded signal quality.

Wireless communications networks are typically divided into cells, with each of the cells further divided into cell sectors. A base station is provided in each cell to enable wireless communications with mobile stations located within the cell. One problem exists when prior art omni-directional antennas are used at the basestation because the transmission/reception of each user's signal becomes a source of interference to other users located in the same cell location on the network, making the overall system interference limited. Such an omni-directional antenna is shown in FIG. 1(a).

In these traditional omni-directional antenna cellular network systems, the base station has no information on the position of the mobile units within the cell and radiates the signal in all directions within the cell in order to provide radio coverage. This results in wasting power on transmissions when there are no mobile units to reach, in addition to causing interference for adjacent cells using the same frequency, so called co-channel cells. Likewise, in reception, the antenna receives signals coming from all directions including noise and interference.

An effective way to increase efficiency of bandwidth usage and reduce this type of interference is to use multiple input-multiple output (MIMO) technology that supports multiple antennas at the transmitter and receiver. For a multiple antenna broadcast channel, such as the downlink on a cellular network, transmit/receive strategies have been developed to maximize the downlink throughput by splitting up the cell into multiple sectors and using sectorized antennas to simultaneously communicate with multiple users. Such sectorized antenna technology offers a significantly improved solution to reduce interference levels and improve the system capacity.

The sectorized antenna system is characterized by a centralized transmitter (cell site/tower) that simultaneously communicates with multiple receivers (user equipment, cell phone, etc.) that are involved in the communication session. With this technology, each user's signal is transmitted and received by the basestation only in the direction of that particular user. This allows the system to significantly reduce the overall interference in the system. A sectorized antenna system, as shown in FIG. 1(b), consists of an array of antennas that direct different transmission/reception beams toward users located in the coverage area of the sector of the cell.

To improve the performance of a sectorized cell sector, schemes have been implemented using orthogonal frequency domain multiple access (OFDMA) systems, which are also called Space-Division Multiple Access (SDMA) systems. In these systems, mobile stations can communicate with the base station using one or more of these spatial beams. This method of orthogonally directing transmissions and reception of signals, called beamforming, is made possible through advanced signal processing at the base station.

A beamforming scheme is defined by the formation of multiple spatial beams within a cell sector to divide the cell sector into different coverage areas. The radiation pattern of the base station, both in transmission and reception, is adapted to each user to obtain highest gain in the direction of that user. By using sectorized antenna technology and by leveraging the spatial location and channel characteristics of mobile units within the cell, communication techniques called space-division multiple access (SDMA) have been developed for enhancing performance. Space-Division Multiple Access (SDMA) techniques essentially creates multiple, uncorrelated spatial pipes transmitting simultaneously through beamforming and/or precoding, by which it is able to offer superior performance in multiple access radio communication systems.

One type of beamforming scheme is an adaptive beamforming scheme that dynamically directs beams toward a location of a mobile station. Such an adaptive beamforming scheme requires mobility tracking in which locations and spatial characteristics of mobile stations are tracked for the purpose of producing the adaptive beams. Depending on location and spatial characteristics, each user's signal is multiplied by complex weightings that adjust the magnitude and phase of the signal to and from each antenna. This causes the output from the array of sectorized antennas to form a transmit/receive beam in the desired direction and minimizes the output in other directions, which can be seen graphically in FIG. 2.

However, the mobility and spatial channel tracking of the user's location in the network cell required by these beamforming antenna systems increases the overhead of the system. Moreover, mobility and spatial channel tracking may not be possible or practical with mobile stations moving at relatively high velocities. There is a need for support of sectorized beamforming antenna systems in mobile broadband communication networks, including solving some of the above-identified problems.

The various components on the system may be called different names depending on the nomenclature used on any particular network configuration or communication system. For instance, "user equipment" encompasses PC's on a cabled network, as well as other types of equipment coupled by wireless connectivity directly to the cellular network as can be experienced by various makes and models of mobile terminals ("cell phones") having various features and functionality, such as Internet access, e-mail, messaging services, and the like.

Further, the words "receiver" and "transmitter" may be referred to as "access point" (AP), "basestation," and "user" depending on which direction the communication is being transmitted and received. For example, an access point AP or a basestaion (eNodeB or eNB) is the transmitter and a user is the receiver for downlink environments, whereas an access point AP or a basestaion (eNodeB or eNB) is the receiver and a user is the transmitter for uplink environments. These terms (such as transmitter or receiver) are not meant to be restrictively defined, but could include various mobile communication units or transmission devices located on the network.

SUMMARY OF THE INVENTION

The present invention is a method and system for supporting a beamforming antenna system in a mobile broadband communication network with an improved beam pattern, beam sweep pattern, pilot channel design with feedback and reporting rules, and control signaling design. Specifically, the improved beam pattern includes a method of supporting wireless communications in a wireless network forming at least two spatial beams within a cell segment where the at least two spatial beams are associated with different power levels, and separately, where at least two spatial beams can be moved across the cell segment according to a unique sweep pattern.

The pilot channel signaling design improves network bandwidth performance and improves the tracking of user channel characteristics, mobility, and location. Feedback and reporting rules can be established using a particular field designator, CQI, in the preferred embodiment. Further, a control signaling design is proposed in the present invention to improve network bandwidth performance and improve the tracking of user channel characteristics, mobility, and location, which uses the forward link (downlink) control signal, FL, in the preferred embodiment. These pilot channel and control signaling designs assist the system in analyzing which directional transmission beam is best suited for the transmission to the user equipment or when the directional transmission beam should be activated. The present invention solves problems associated with tracking user equipment spatial channel characteristics, mobility or location, improve bandwidth and coverage performance of the network, and reduce overhead transmissions of the network.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
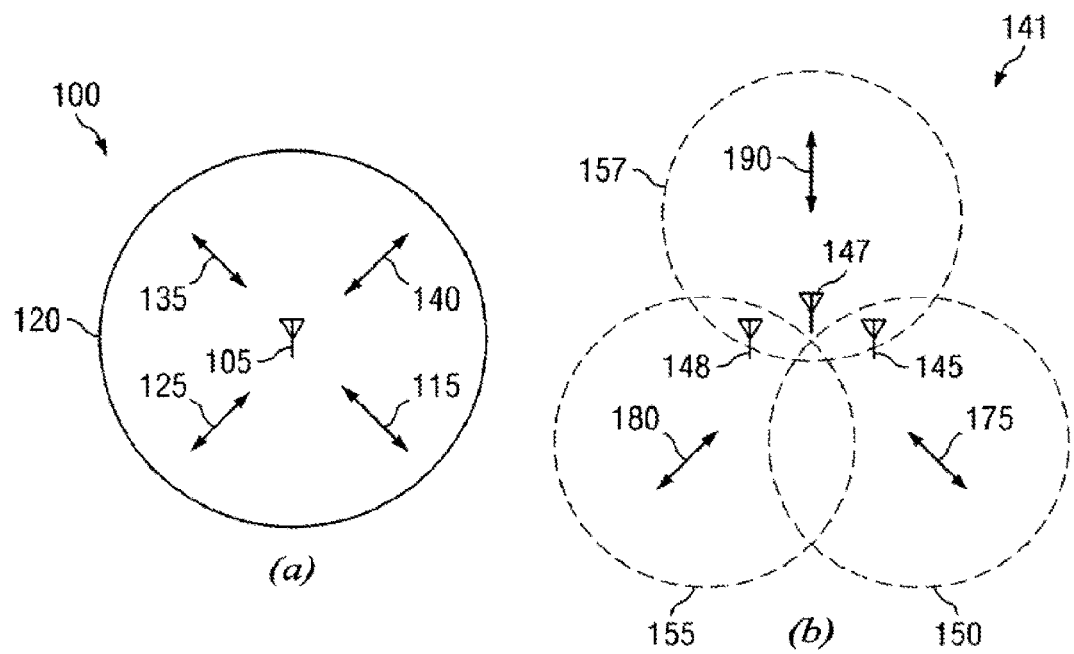
FIG. 1 is a graphical illustration of an omni-directional antenna (a) and a sectorized antenna (b)

In FIG. 1(a), the overall transmission architecture 100 of an omni-directional antenna 105 that transmits radially outward equally in various directions shown by arrows 125, 115, 135 and 140. The perimeter of the coverage area is shown by the area 120 for the transmission architecture 100. Improved efficiencies have been achieved by using the sectorized antenna architecture 141 shown in FIG. 1(b).

Multiple antennas 145, 147 and 148 are shown in the architecture 140, wherein each antenna is directed toward a different region of the cellular network shown by the directional transmission 175 for coverage area 150, transmission 190 for coverage area 157, and directional transmission 180 for coverage area 155. In this context, it is possible for system capacity to be improved by the sectorized architecture.

Figure 2:
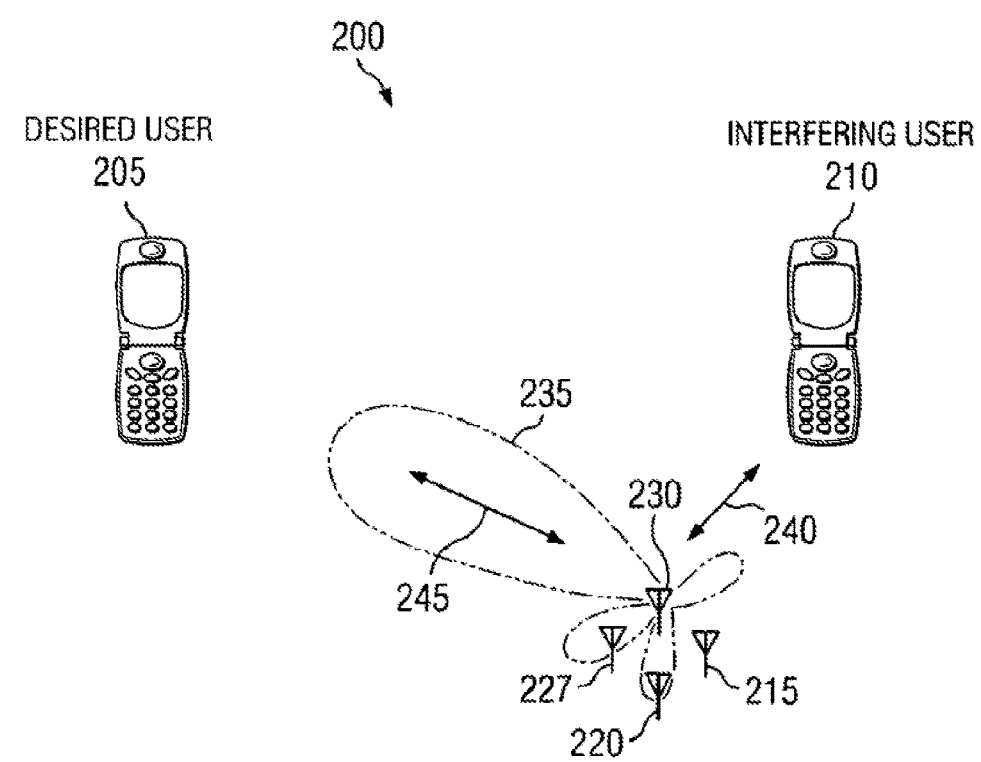
FIG. 2 is a graphical illustration of a weighted sectorized transmission beam directed to the desired user.

By varying the strength of various transmission signals, additional efficiencies and reduced interferences can be achieved as shown in FIG. 2 for the sectorized architecture 200. Multiple antenna 215, 220, 227 and 230 direct transmissions (or receive transmissions) in the sectorized antenna architecture 200. A directional antenna beam 235 is formed by increasing the strength of that signal from antenna element 230. The desired user 205 is shown receiving a desired transmission 245 in high signal strength coverage area 235, which is a higher powered beam meant to be directed to that user 205. An interfering user 210 is shown with lower strength transmission signal 240, which reduces the interference encountered in the system related to that user 210.

In accordance with some preferred embodiments, an "opportunistic" space time multiple access (OSTMA) technique is provided for use in wireless communications networks. The OSTMA technique enables the formation of multiple spatial beams in a cell segment (cell or cell sector), where at least some of the multiple spatial beams of the cell segment are associated with different power levels to provide different coverage areas within the cell segment. A spatial beam (or more simply "beam") refers to a geographically distinct coverage region within a cell segment in which wireless communication between a base station and mobile station(s) can be performed.

In addition, the OSTMA technique defines a sweep pattern for the beams within a cell segment, where the sweep pattern can be a fixed sweep pattern or a dynamic sweep pattern. A "sweep pattern" refers to a manner in which beams within a cell segment are moved, over time, among beam positions in the cell segment. A fixed sweep pattern means that the beams are moved among the beam positions according to a predetermined sequence. A dynamic sweep pattern means that the beams can be moved among the beam positions in possibly different sequences, depending upon one or more criteria. According to preferred embodiments, the beam positions across which beams are moveable are fixed beam positions—thus, although the spatial beams are moveable within the cell segment, the positions to which such beams are moved remain fixed for a certain time duration. It is also possible to re-configure beam positions within the system. (e.g. change 2 beams to 4 beams, or 8 beams, etc.).

To some preferred embodiments, the OSTMA scheme is provided for the forward wireless link from the base station to the mobile stations. In alternative embodiments, the OSTMA scheme can also be used for the reverse wireless link from the mobile station to the base station. The communication connection in which data flow from the base station to the mobile station is called the forward link (FL). Likewise, the communication connection in which data flow from the mobile station to the base station is called the reverse link (RL). Communication conditions are not always the same for both the FL and the RL. For example, a mobile station may be communicating with a serving base station which has a highly congestive RL traffic but a relatively open FL flow. The mobile station may need to adjust its RL connections because to stay with the same base station for both FL and the RL (if a more open RL connection is available from another base station) may not be the best use of communication resources.

Figure 3:
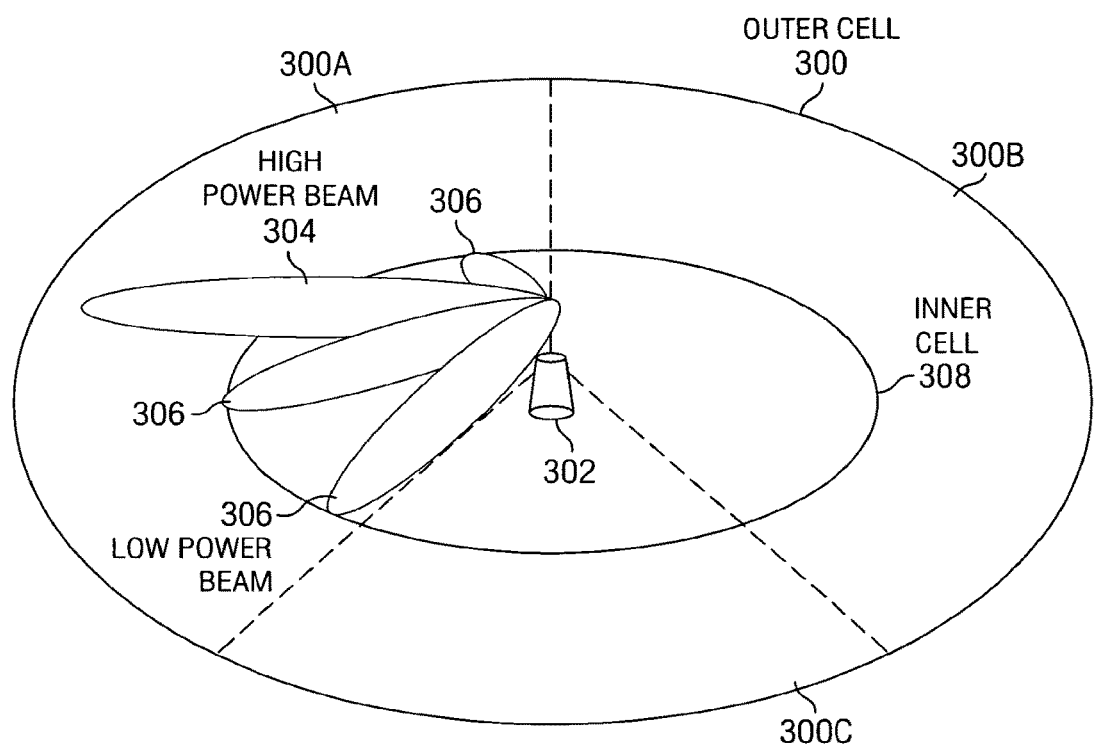
FIG. 3 illustrates an exemplary cell that is associated with a base station that is capable of forming spatial beams having different power levels that are moved according to a sweep pattern, in accordance with a preferred embodiment.

In one example, as depicted in FIG. 3, a cell 300 has three sectors 300A, 300B, and 300C. Within sector 300A, a base station 302 has an antenna structure that forms multiple spatial beams, including a high-power beam 304 and low-power beams 306. A "high-power beam" refers to a beam in which wireless communications is performed at an elevated transmission power, whereas a "low-power beam" refers to a beam in which wireless communications is performed at a transmission power less than the elevated transmission power.

In FIG. 3, the coverage area within the inner edge 308 is referred to as an "inner cell region," and the ring-shaped area between the inner cell region and the outer edge of the cell 300 is referred to as an "outer cell region." Note that the high-power beam 304 is able to provide a coverage area from the antenna structure 302 to an edge of the cell 300. On the other hand, the low-power beams 306 are able to provide coverage up to an inner edge 308 where the inner edge has a radius that is smaller than a radius associated with the outer edge of the cell 300.

The high-power beam 304 provides coverage for mobile stations located in both the inner and outer cell regions, whereas the low-power beams 306 are used to provide coverage for mobile stations located within the inner cell region (but not the outer cell region). The low power beams can be operable at substantially similar power levels, or dissimilar power levels, in each instance at a transmission power that is less than the high power level. Although just one high-power beam 304 is depicted, it is noted that multiple high-power beams 304 can be used in alternative preferred embodiments.

In the present invention, the beam pattern of simultaneous high power and low power beams transmitted from the basestation (access node) applies to the forward link, but can be adapted to apply to the reverse link as well. The high power beam services users on the edge of the cell site, whereas the low power beams serve the users in the center of the cell site. A "superframe" preamble may be used in conjunction with the present invention and transmitted omni-directionally in the sector.

Employing low-power beams 306 allows for less interference from transmissions in each of the cell sectors 300A, 300B, and 300C. This is contrasted with conventional techniques in which multiple beams formed within a cell sector have a fixed power level, where the fixed power level is high enough such that the beam can cover all the way to the edge of the cell sector. As a result, by employing multiple beams all at the same relatively high power level, interference created in adjacent cells is increased. In contrast, using the OSTMA technique according to the preferred embodiments in which some of the beams of a cell sector are lower power than other beams in the cell sector, reduced interference is achieved.

Although reference is made to providing spatial beams in a cell sector in this description, it is noted that similar techniques can be provided for entire cells. In accordance with some preferred embodiments, since not all of the spatial beams within a cell sector are able to provide coverage to mobile stations within the outer cell region, the high-power beam 304 can be moved to different beam positions to provide coverage for different mobile stations located at different locations in the outer cell region.

Figure 6:
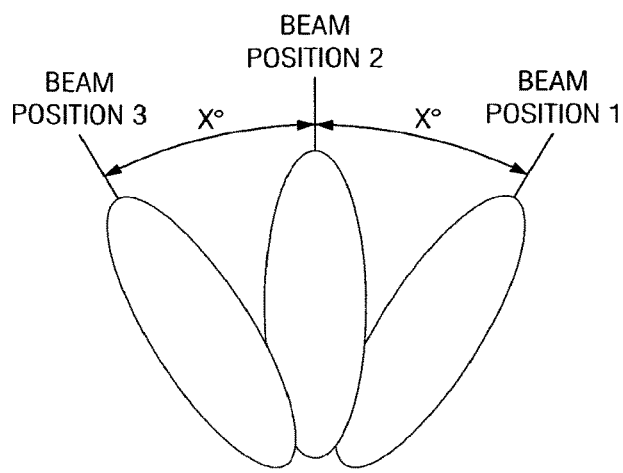
FIGS. 6-7 illustrate different beam configurations, in accordance with some preferred embodiments.
Figure 7:
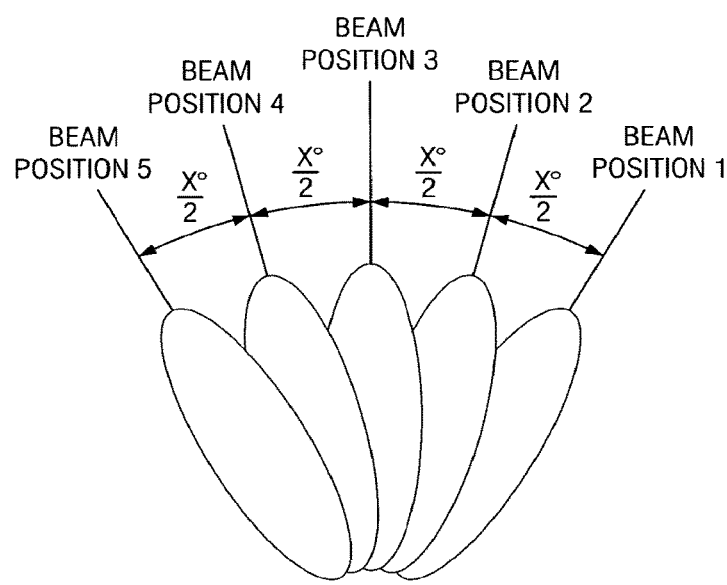

The beams within a cell sector or cell can be non-overlapped beams (such as depicted in FIG. 6) or overlapped beams (such as depicted in FIG. 7), In some implementations, beams are considered non-overlapped if the following is true: if the 3-dB (decibel) beamwidth is x°, then the beams are separated by about every x°, as depicted in FIG. 6. Beams are considered to be overlapped if the following condition is true: if the 3-dB-beamwidth is x°, the beams are separated by less than some predefined fraction (e.g., ½) of x°. FIG. 7 shows an example in which adjacent beams are separated by x/2° separation.

Figure 4:
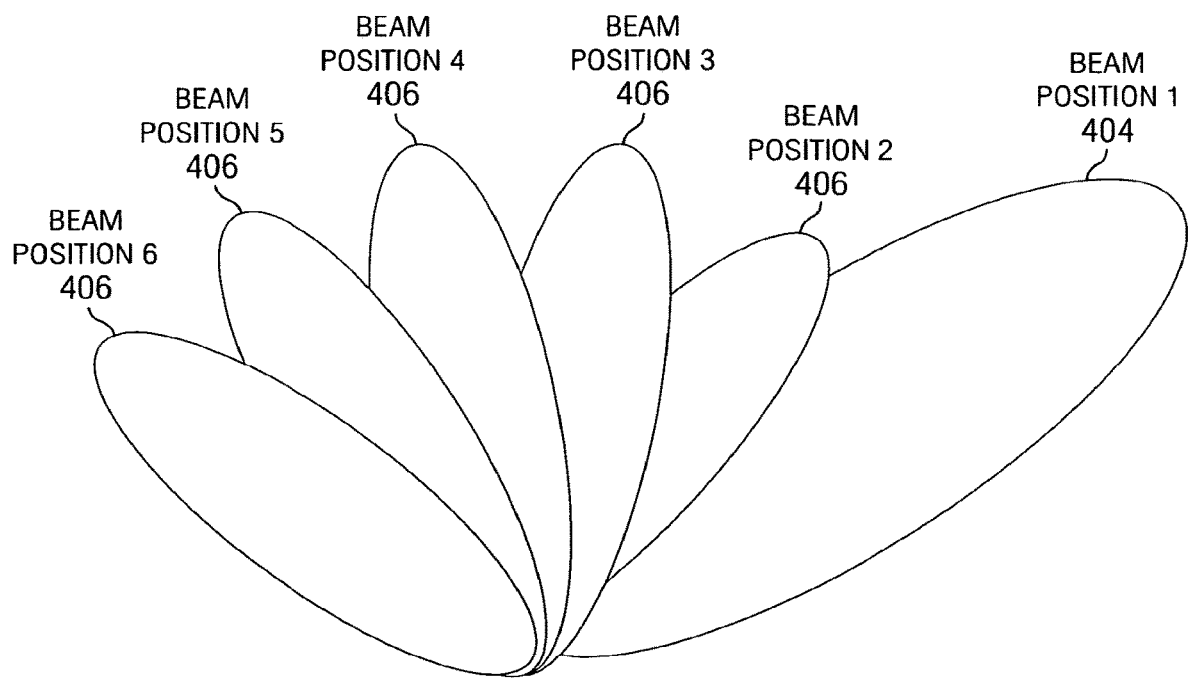
FIG. 4 illustrates spatial beams associated with different beam positions that are formed within a cell sector, in accordance with a preferred embodiment.

FIG. 4 shows an example in which six possible beam positions are provided. In the example of FIG. 4, the high-power beam 404 is provided in beam position 1, whereas the low-power beams 406 are provided in beam positions 2-6. Beam positions 1-6 are the fixed beam positions across which the low and high-power beams 404, 406 can be swept.

Sweeping of the beams among the six exemplary beam positions of FIG. 4 is depicted in FIGS. 5A-5F. FIGS. 5A-5F show two mobile stations labeled AT1 and AT2. Mobile station AT1 is located in the outer cell region and thus within the reach of the high-power beam 404, but not the low-power beams 406. On the other hand, mobile station AT2 is located within the inner cell region and thus is within the coverage area of the low-power beams 406. At time interval 1 (FIG. 5A), the high-power beam in the example depicted in FIGS. 5A-5F is located in beam position 1. The low-power beams 406 are located in beam positions 2-6.

Figure 5A:
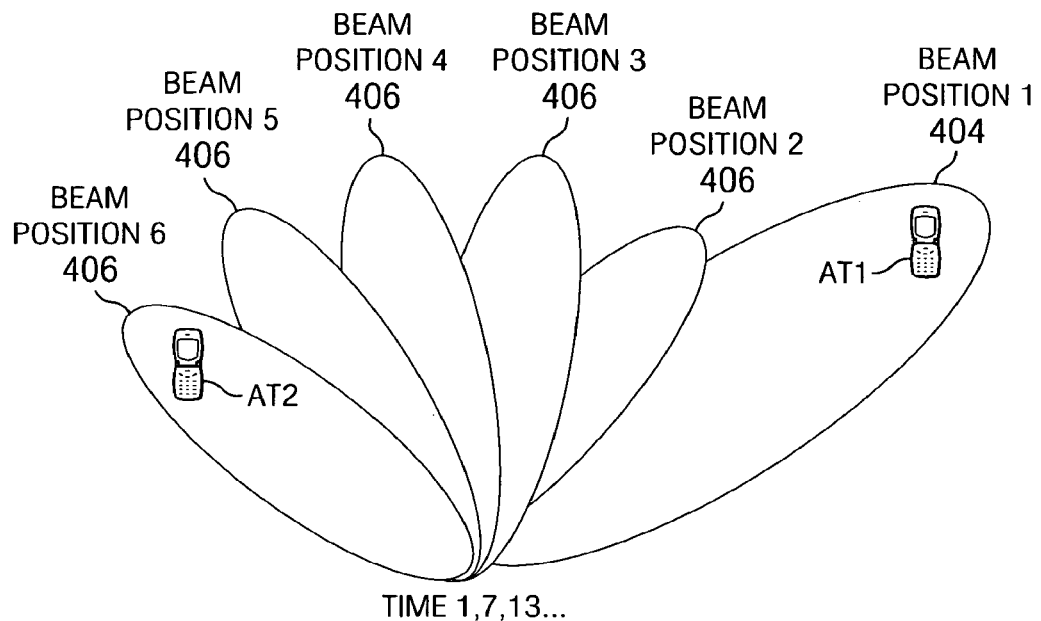
FIGS. 5A-5F illustrate sweep patterns of the spatial beams, in accordance with an embodiment.
Figure 5B:
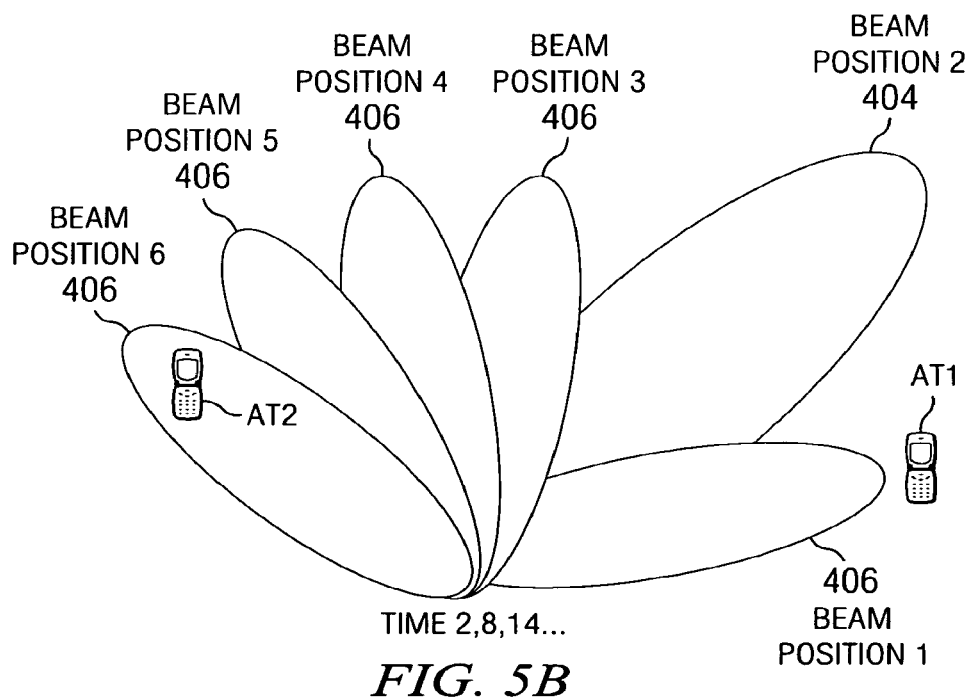
Figure 5C:
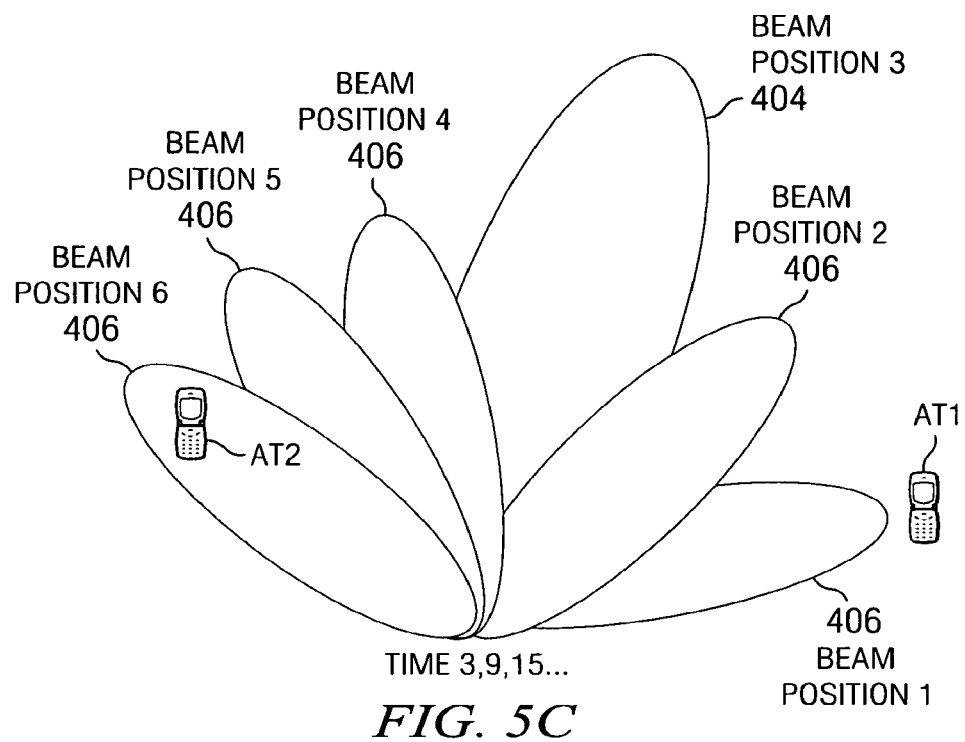
Figure 5D:
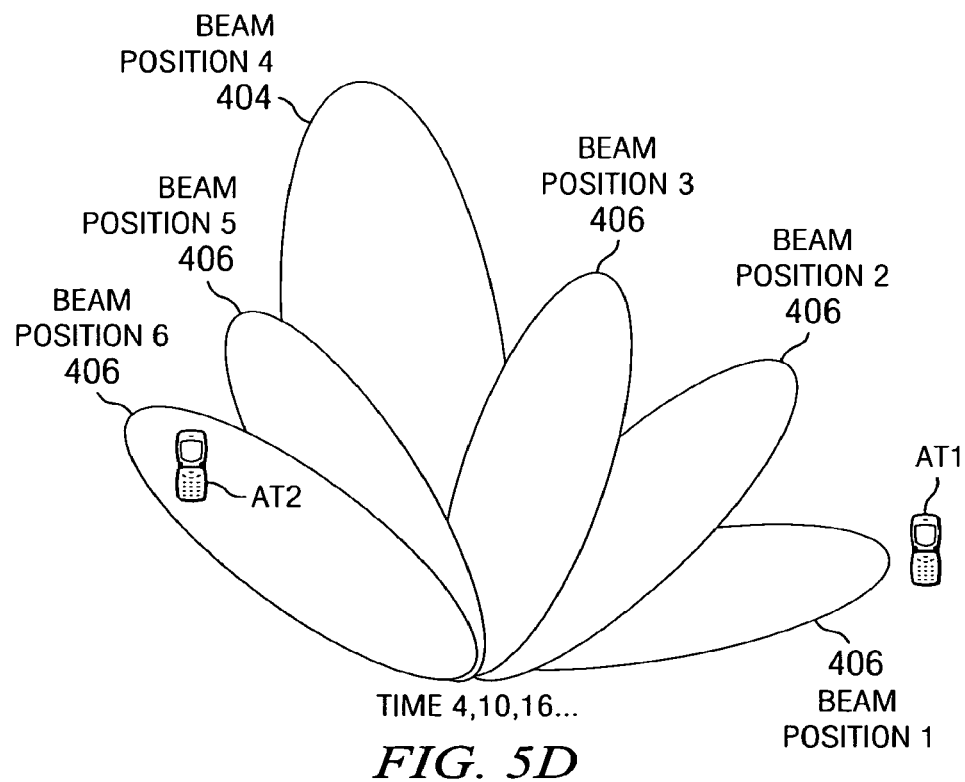
Figure 5E:
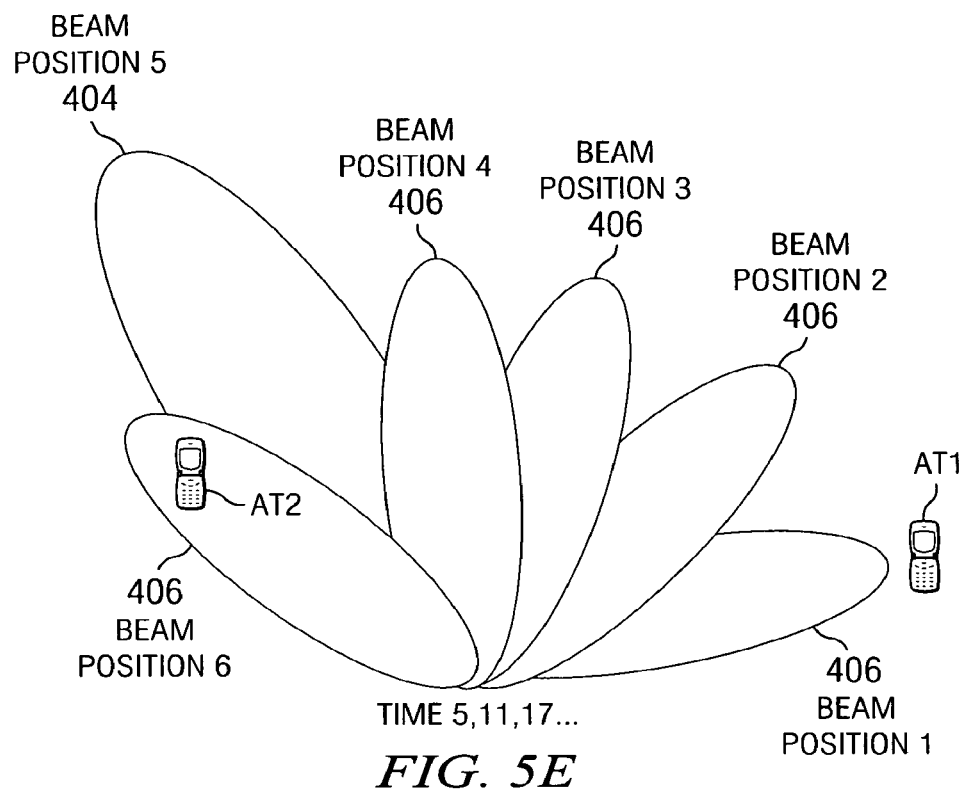
Figure 5F:
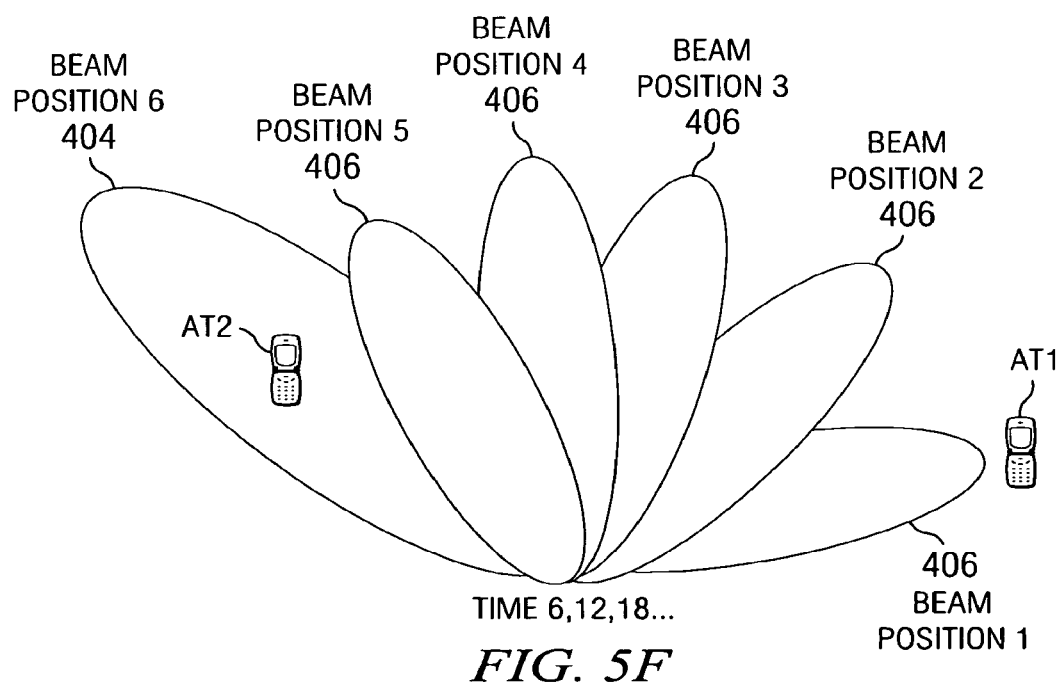

At time interval 2 (FIG. 5B), the high-power beam 404 has moved to beam position 2, and a low-power beam 406 is now in beam position 1. Note that in FIG. 5B, mobile station AT1 is outside the coverage region of the low-power beam 406 in beam position 1. At time interval 3 in FIG. 5C, the high-power beam 404 has moved to beam position 3, with a low-position beam replacing the high-power beam in beam position 2. The movement of the high-power beam 404 and low-power beams 406 continues in each of the successive time intervals 4, 5, and 6 (FIGS. 5D, 5E, and 5F, respectively).

The six time intervals together make up a sweep period. Within a sweep period, the high-power beam 404 is moveable to cover all possible beam positions. More generally, within each sweep period, any given beam is moveable to cover all possible beam positions. The sweep pattern then repeats for the next beam period, with the high-power beam 404 returning to beam position 1 at time interval 7 and continuing on to time interval 13 as the next interval for beam position 1. The sweep pattern depicted in FIGS. 5A-5F is an example of a fixed (or deterministic) pattern in which each beam rotates by one beam position with each time interval. In a different embodiment, other patterns can be used, including other types of deterministic patterns or even random patterns. The high-power beam may also be scheduled based on cell-edge user density in each beam pattern.

In an alternative embodiment, four beams can be used instead of six beams, with one beam being a high-power beam 404 and the remaining three beams being low-power beams 406. An 8-interface HARQ structure would be used in this embodiment. The beam sweep pattern in this embodiment would start with the high-power beam 404 being in position 1, and the low-power beams being in positions 2, 3 and 4 at time interval 1. At time interval 2, the high-power beam 406 would shift to position 2, with the low-power beams being in position 1, 3 and 4. At time interval 3, the high-power beam 406 would shift to position 3, with the low-power beams being in position 1, 2 and 4. At time interval 4, the high-power beam 406 would shift to position 4, with the low-power beams being in position 1, 2 and 3. After time interval 5, the beam pattern would repeat beam position 1 for the high-power beam 406, with low-power beams at positions 2, 3, and 4. The beam pattern would then repeat the sequence sweeping across the cell sector in that fixed beam pattern.

In an alternative embodiment, three beams can be used instead of four or six beams, with one beam being a high-power beam 404 and the remaining two beams being low-power beams 406. A 6-interface HARQ structure would be used in this embodiment. The beam sweep pattern in this embodiment would start with the high-power beam 404 being in position 1, and the low-power beams being in positions 2 and 3 at time interval 1. At time interval 2, the high-power beam 406 would shift to position 2, with the low-power beams being in position 1 and 3. At time interval 3, the high-power beam 406 would shift to position 3, with the low-power beams being in position 1 and 2. At time interval 4, the beam pattern would repeat beam position 1 for the high-power beam 406, with low-power beams at positions 2 and 3. The beam pattern would then repeat the sequence sweeping across the cell sector in that fixed beam pattern.

In alternative embodiments, instead of using a fixed sweep pattern, a dynamic sweep pattern can be employed. With the dynamic sweep pattern, the movement of beams across the beam positions of a cell sector can be dynamically based on one or more of the following criteria: presence of mobile stations within a geographic region of a cell sector, channel conditions (e.g., conditions of wireless links), quality of service (QoS) requirements of applications involved in wireless communications, loading of channels, and so forth.

For example, depending upon the one or more criteria, instead of having the high-power beam 404 sweep in the deterministic manner depicted in FIGS. 5A-5F, a scheduler associated with a base station can specify that the high-power beam remain in a particular beam position for more than one time interval. Also, the scheduler can specify that rather than the high-power beam 404 progressively moving to the next beam position with each time interval, the high-power beam can instead be moved to another target beam position several positions away. Instances where it may be desirable to move the high-power beam in this manner include instances where the scheduler may have detected that mobile stations at the target beam position may require servicing (e.g., such mobile stations may have higher QoS requirements that would indicate that priority should be given to servicing such mobile stations over other mobile stations with lower QoS requirements).

In some embodiments, note that each beam can have its own sweep pattern and beam duration. The base station can coordinate the multiple sweep patterns and beam durations of the multiple beams within a cell or cell sector. The sweep pattern of beams provides for spatial variation of the beams. In addition to providing spatial variation, some preferred embodiments also allows for time-based variation, which is defined by beam duration (the amount of time a beam remains at a particular beam position). Generally, the beam design according to preferred embodiments is specified by its sweep pattern and beam duration of a beam. The sweep pattern (fixed or dynamic) is specified by a sequence of beam positions as time evolves. The beam duration can also be fixed or dynamic.

Different cells or cell sectors can use different sets of fixed beam positions, as well as different numbers of beams that are turned on simultaneously. The sweep patterns and/or beam durations can also differ in different cells or cell sectors. The beam sweep pattern embodiments (six, four or three beams, fixed or dynamic sweep patterns, etc.) relate to single sectors on the cell site location. Other sectors may use similar beam pattern sweeps or high-low power beams to communicate with user equipment located in the other sectors. The system, however, must consider the beam patterns and synchronous systems of the neighboring sectors to avoid high power beam collisions that may result if these beam patterns are not coordinated among the different sectors in the cell site location. As such, coordination between multiple base stations would be desirable to reduce inter-cell/inter-sector interference and to support network-based MIMO (multiple input multiple output) (which refers to the ability of a transmitter that has multiple antennas to send multiple information simultaneously for receipt by multiple antennas of a receiver).

In some embodiments, four possible configurations may be available: (1) configuration 1 (static sweep pattern and static beam duration); (2) configuration 2 (dynamic sweep pattern and dynamic beam duration); (3) configuration 3 (dynamic sweep pattern and static beam duration); and (4) configuration 4 (static sweep pattern and dynamic beam duration).

With configuration 1, where a static (fixed) sweep pattern with static (fixed) beam duration are used, one possible benefit is that less control overhead and feedback would be required. For example, with a fixed sweep pattern and fixed beam duration, the time interval within a sweep period can be implicitly used as a beam identifier and the mobile station does not have to provide any feedback regarding the beam identifier. The mobile station can also run predictive algorithms, such as to listen to the forward link only when the mobile station expects the beam to sweep to its location, i.e. (discontinuous reception (DRX)). Discontinuous transmission (DTX) can be performed if there is no mobile station within a particular coverage area of a beam. DTX refers to gating applied to a transmitter to turn off a transmission.

The sequence of beam positions that describe the sweep pattern can be sequential, pseudorandom, or coded in terms of beam positions. In the example where there are five beams per cell sector, one example of a sequential sweep pattern is as follows: $\{1, 2, 3, 4, 5, 1, 2, 3, 4, 5, \ldots\}$. What this means is that a particular beam goes to beam position 1 in a first time interval, position 2 in a second time interval, position 3 in a third time interval, position 4 in a fourth time interval, position 5 in a fifth time interval, back to position 1 again in the sixth time interval, and so forth.

An example of a pseudorandom sweep pattern is as follows: $\{2, 5, 3, 1, 4, 2, 5, 3, 1, 4 \ldots\}$. Note that the difference between the pseudorandom sweep pattern and the sequential sweep pattern is that within a sweep period of five time intervals, the sequence of the sweep does not progress from position 1 to position 2 to position 3 to position 4 to position 5, but rather the sweep of a particular beam is randomized. In the example above, a beam position starts in position 2 in a first time interval, proceeds to position 5 in a second time interval, proceeds to position 3 in a third time interval, proceeds to position 1 in a fourth time interval, and proceeds to position 4 in a fifth time interval. This sequence repeats again in the next sweep period. Thus, from sweep period to sweep period, the pseudorandom sweep pattern repeats the same order of pattern positions.

Figure 8:
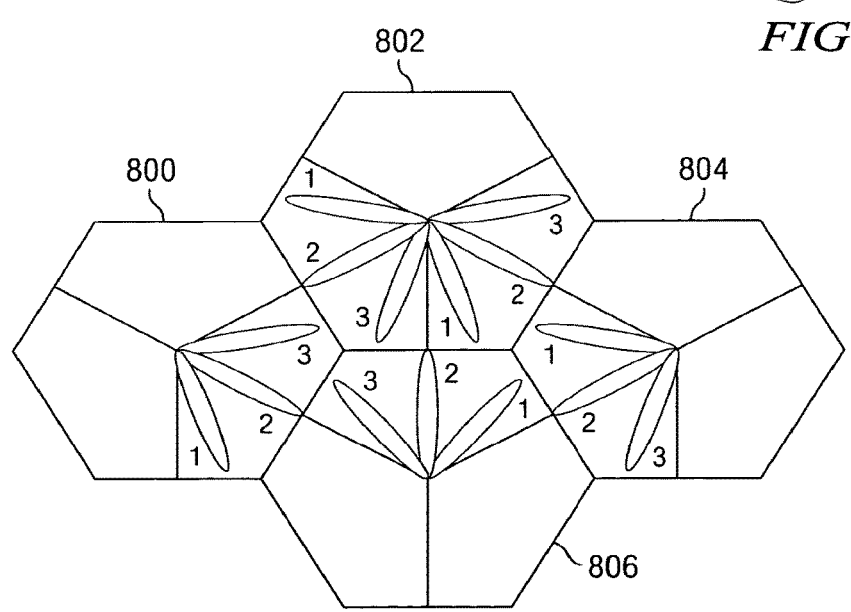
FIG. 8 illustrates spatial beams formed in different cell sectors, in accordance with a preferred embodiment.

A coded sweep pattern refers to a sweep pattern that depends upon which cell sector the beams are located in. Different cell sectors (associated with different codes) would use different sweep patterns. FIG. 8 shows an example that has multiple cells 800, 802, 804, and 806, with each cell having three cell sectors. In the example of FIG. 8, it is assumed that there are three beams per cell sector. The beam positions are numbered sequentially from 1 to 3 in a counter-clockwise direction. The sweep pattern of a cell sector in cell 806 can be: $\{1, 2, 3, 1, 2, 3, \ldots\}$. The sweep pattern of a cell sector of each of cells 800 and 804 can be $\{2, 3, 1, 2, 3, 1, \ldots\}$, and the sweep pattern in each cell sector of cell 802 can be $\{3, 1, 2, 3, 1, 2, \ldots\}$. The different sweep patterns used in the different cells are designed to reduce inter-cell interference (interference between beams located in different cells).

In configuration 2, where dynamic sweep pattern and dynamic time duration are used, flexible on-demand beamforming can be provided. For example, a beam can be formed based on mobile station presence in a coverage area of a beam, based on the channel condition, based on QoS, and based on support of special transmission schemes, such as network-based MIMO. However, although flexibility is enhanced, the complexity of the base station scheduler and feedback mechanism is also increased to support such beamforming patterns and durations. To enable dynamic sweep pattern and dynamic beam duration, pre-flash messages (discussed further below) can be sent by the base station to allow mobiles stations to report measurements back to the base station.

The other configurations that can be employed include configuration 3, which uses dynamic sweep pattern and static beam duration, and configuration 4, which uses static sweep pattern and dynamic beam duration. More generally, the dynamic variation of one or more characteristics (e.g., sweep pattern and/or beam duration) can be based on one or more of the following criteria: presence of mobile stations within a particular geographic region, channel conditions (e.g., conditions of wireless links), QoS requirements of applications involved in wireless communications, loading of channels, and so forth. Another characteristic of beams that can be varied (based on one or more of the above-listed criteria) is beam duty cycle, which specifies the amount of time that a beam is activated, or turned on, within the beam duration. The duty cycle of a beam refers to the ratio of the time that a beam is activated (or turned "on") versus the amount of time that a beam is deactivated (or turned "off") for a given beam position and during a given time interval. For example, the duty cycle of a particular beam in beam position 1 can be 70%, which means that the beam will be activated (or turned "on") for 70% of the time interval and deactivated (or turned "off") for 30% of the time interval. The ability to vary the duty cycle of a beam based on scheduling needs allows for lower interference levels because beams that are no longer needed can be turned off temporarily or for greater periods of time.

In accordance with some preferred embodiment, basestations are able to perform "pre-flash" to enable dynamic adjustment of one or more characteristics (e.g., sweep pattern, beam duration, beam duty cycle, etc.). For example, when a dynamic sweep pattern is used, a high-power beam may be located in a particular beam position for a relatively extended period of time. This situation may prevent other mobile stations in the outer cell region of other beam positions from being able to communicate with the base station for the relatively extended period of time.

To address this issue, pre-flashing can be used, where pre-flashing refers to a procedure in which a base station issues a short pilot burst (or burst of other messaging) to a particular direction. Mobile stations in the coverage area corresponding to the particular direction can then make measurements of the pre-flash message and provide reports back to the base station regarding the measurements. In one example, a mobile station can report an indication of wireless channel quality, such as in the form of a channel quality indication (CQI). The base station can perform pre-flashes in all directions of a particular cell sector. Using the measurement reports from the mobile stations, the base station is able to perform scheduling as discussed above by dynamically adjusting beam duration, duty cycle, and beam scheduling.

Note that the pre-flashes issued by the base station and actual traffic transmissions can be time multiplexed with different periodicities (which means that the periods during which pre-flashes are transmitted can be adjusted relative to the periods during which traffic is transmitted). For example, the pre-flashes can be issued in the middle of a lengthy download of data to a particular mobile station, with the pre-flashes done in a time multiplexed manner with the download of data to the particular mobile station.

Figure 9:
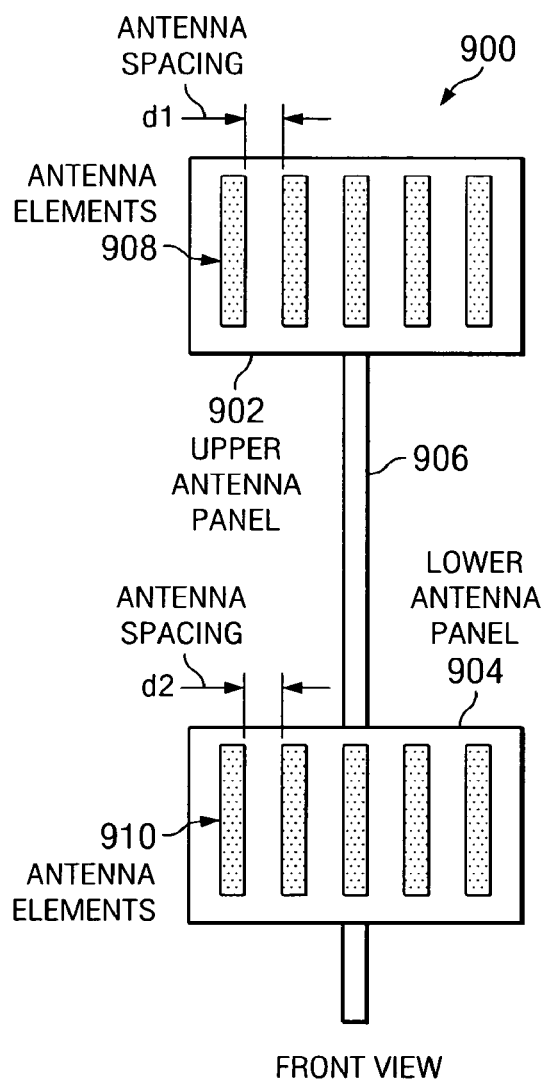
FIG. 9 is a front view of an antenna structure of a base station that has two antenna panels, where each antenna panel has antenna elements capable of forming spatial beams according to some preferred embodiments.

In accordance with some embodiments, as depicted in FIG. 9, an antenna structure 900 (which is part of a base station, such as base station 302 in FIG. 3) can be provided with multiple antenna assemblies, including an upper antenna assembly 902 mounted to an antenna support 906, and a lower antenna assembly 904 mounted to the antenna support. In the implementation depicted in FIG. 9, each of the antenna assemblies 902 and 904 is an antenna panel. The antenna assembly 904 is positioned below (in the vertical direction) the upper antenna assembly 902.

The antenna assembly 902 includes multiple antenna elements 908. The lower antenna assembly 904 includes multiple antenna elements 910. The antenna elements 908 and 910 can cooperate to form the beams within, a cell sector that is served by the antenna structure 900.

Figure 10:
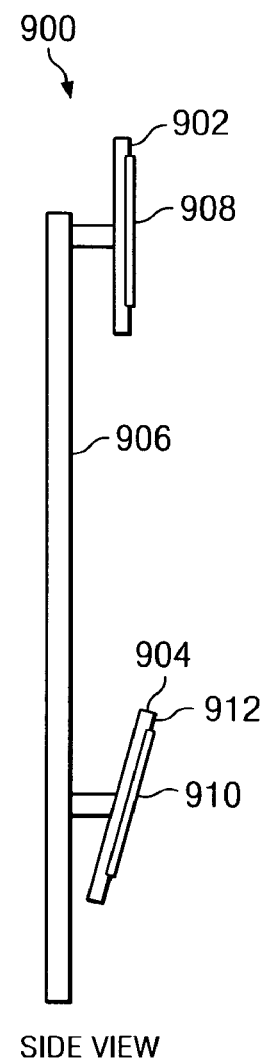
FIG. 10 is a side view of the antenna structure of FIG. 9.

A side view of the antenna structure 900 is depicted in FIG. 10. Note that the lower antenna panel 904 is angled with respect to the vertical axis of the support 906, such that the forward face 912 (on which the antenna elements 910 are mounted) face slightly downwardly (at an angle). In the example of FIG. 10, the upper antenna panel 902 is generally parallel to the vertical axis of the support 906. In other implementations, other arrangement of the upper and lower antenna panels 902 and 904 can be provided. In yet another implementation, more than two antenna panels can be used.

In one exemplary implementation, the antenna elements 908 of the upper antenna panel 902 can be used for forming beams to cover the outer cell region as well as to communicate with adjacent base stations in the neighboring cells. The lower antenna panel 904 can be used to form low-power beams for a given cell sector, as well as possibly a high-power beam to cover up to the edge of a particular cell sector.

The information that is communicated in beams between base stations in different cells includes backhaul information and coordination information. The coordination information can be used to coordinate handover of mobile stations between different cells. The coordination information can also enable coordination of sweep patterns and sweep durations in different cells to reduce inter-cell/inter-sector interference, and to support network-based MIMO.

"Backhaul" information refers to control and data typically communicated over a backhaul connection between a base station and a wireless network controller (e.g., packet data serving node, serving gateway, etc.). An issue associated with wireless communications networks is that the sizes of cells can be relatively small, particularly in densely populated areas such as urban areas. Another reason for small cell sizes can be requirements for high data rates or high carrier frequencies. With smaller cell sizes, a larger number of cells (and thus corresponding base stations) are present. Each base station typically has to be connected by a backhaul network to a wireless network controller. A large number of basestations means that a corresponding large number of backhaul connections would have to be provided. Backhaul connections can be expensive to deploy, and providing a relatively large number of such backhaul connections in a wireless communications network can increase the costs for a wireless network operator, In accordance with some preferred embodiments, to reduce the number of backhaul connections that would have to be deployed, the antenna structures of base stations can form beams (referred to as "backhaul beams") used to carry backhaul information. For example, in FIGS. 9-10, a beam of the upper antenna panel 902 can be employed for the purpose of communicating the backhaul information to another base station that may be connected by a backhaul connection to the wireless network controller. In general, a subset of base stations in a wireless network can be deployed with backhaul connections to a wireless network controller. The remaining base stations are not deployed with backhaul connections—rather, such base stations communicate backhaul information over beams to corresponding base station(s) deployed with a backhaul connection.

Figure 11:
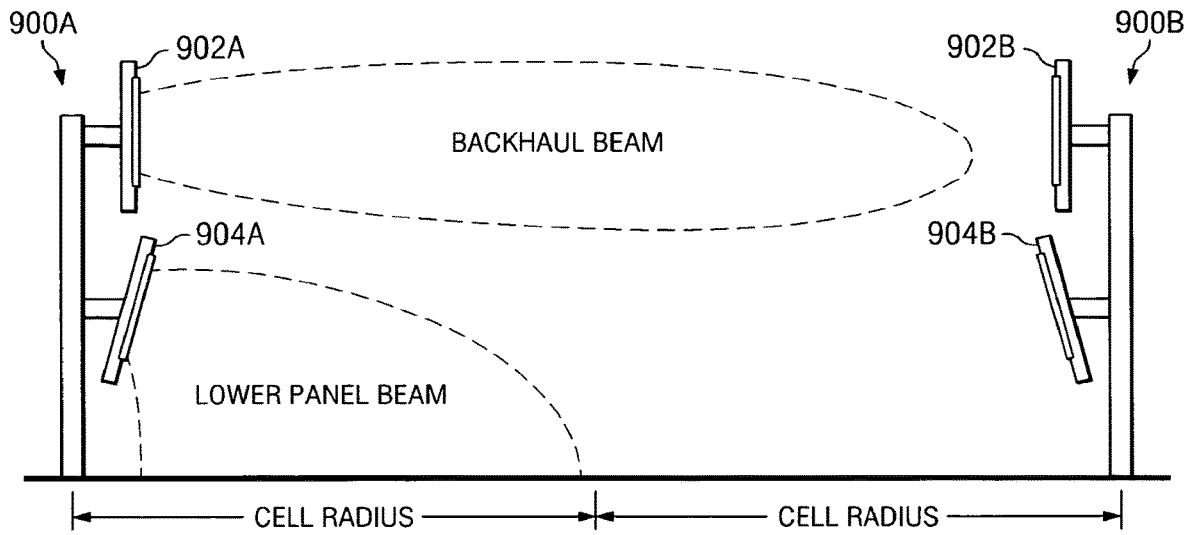
FIG. 11 illustrates a first configuration of spatial beams generated in two different cells, in accordance with an embodiment.

FIG. 11 shows two antenna structures 900A and 900B located in two different corresponding cells. In the configuration of FIG. 11, there is no overlap of coverage zones between the upper and lower antenna panels 902A, 904A (and 902B and 904B). A backhaul beam can be formed between upper antenna panels 902A and 902B of the two antenna structures 900A and 900B, respectively. Each of the lower antenna panels 904A and 904B are used to form beams for coverage within respective cell.

Figure 12:
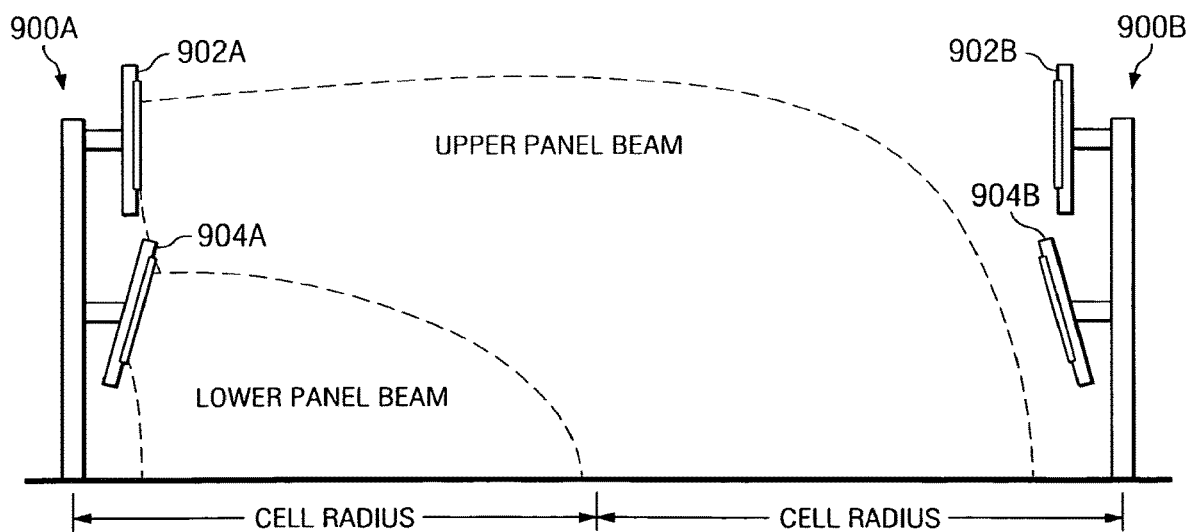
FIG. 12 illustrates a second configuration of spatial beams generated in two cells, according to another embodiment.

FIG. 12 shows a configuration in which there is an overlap of coverage by an upper panel beam and lower panel beam. In this manner, the two panels can provide MIMO in the outer cell region, where the multiple output antennas include some combination of antennas from the upper and lower panels. The multiple output antennas of the upper panel and lower panel together can thus provide for increased diversity gain, multiplexing gain, and/or array gain.

Various other configurations are also possible. For example, at different times, the upper and lower antenna panels can be used to provide different coverage over the cell sector at different time intervals. For example, in one time period, the lower panel can be used to cover the entire cell. In another time period, the upper panel can be used to cover just the outer cell region, as well as to provide a backhaul beam. In yet another time period, both the lower and upper panels can be used cover the outer cell region. In yet another configuration, in a first time period, the lower panel can be used to cover the inner cell region, while the upper antenna panel is used to provide the backhaul beam. In a different time period, both the lower and upper antenna panels are used to cover the inner cell region.

Depending on the desired configuration, the upper and lower antenna panels can be placed close together or far apart. Also, the two antenna panels can use antenna elements having different antenna polarizations. The two antenna panels can operate independently or cooperatively. The two antenna panels can transmit in a time division multiplex manner or simultaneously. Alternatively, the two antenna panels can be transmitted in a frequency domain multiplex (FDM) manner or at the same frequency.

Moreover, if there is coordination between the upper and lower antenna panels, a handoff of a mobile station is possible from a lower panel beam to an upper panel beam or vice versa. Note also that with use of upper and lower antenna panels, power levels of all beams for cell coverage formed by the antenna elements of the upper and lower panels can be at the same power level. In such configuration, the coverage of the inner cell region versus outer cell region (ring-based coverage) can be accomplished by orienting the upper and lower panels differently (e.g., the lower panel can be angled downwardly to cover the inner cell region, while the upper panel is not angled to cover the outer cell region.

Figure 13:
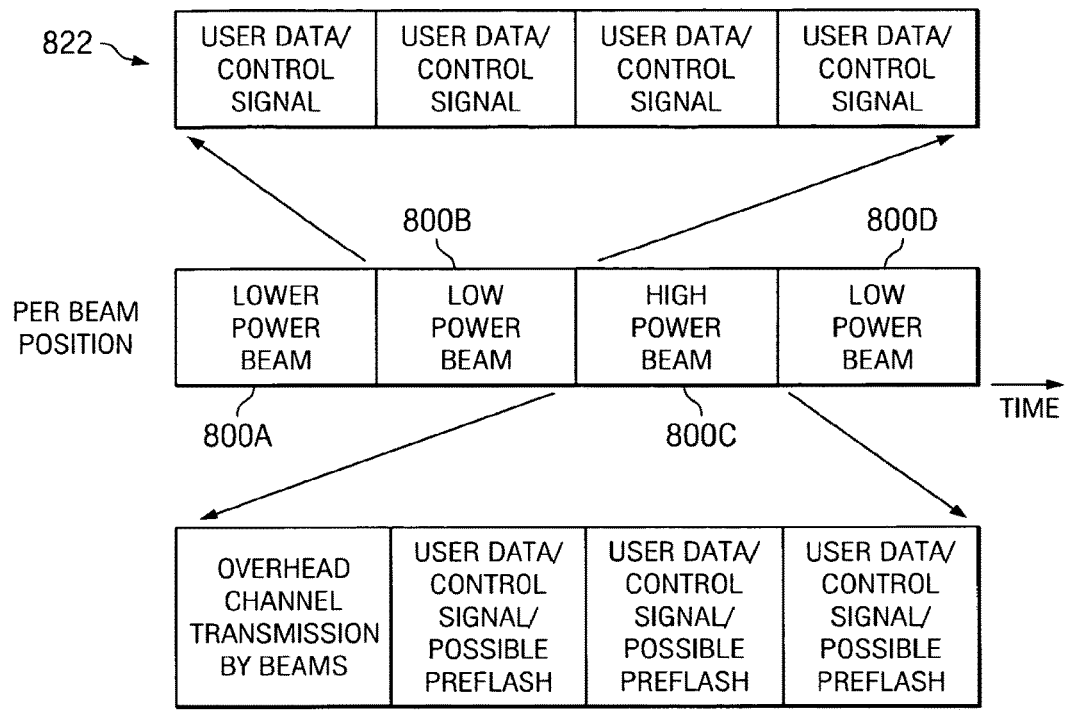
FIGS. 13 and 14 illustrate different techniques of communicating control and data signaling, in accordance with some preferred embodiments.

FIG. 13 shows, for a particular beam position within a cell sector, multiple time intervals 800A, 800B, 800C, and 800D. Low-power beams are transmitted in time intervals 800A, 800B, and 800D, and a high-power beam is transmitted in time interval 800C. As depicted in FIG. 13, a low-power beam, such as the low-power beam in time interval 800B, can be used to transmit user data and control signals, as represented by 822. On the other hand, the high-power beam in time interval 800C can be used to transmit user data and control signals, as well as other control information, such as broadcast overhead channels and pre-flash messages. Broadcast overhead channels can include a system acquisition channel containing time and frequency synchronization information, as well as cell, sector, or beam identifier information; and a system broadcast overhead channel, that can carry system parameters such as beam sweep patterns, and so forth.

Figure 14:
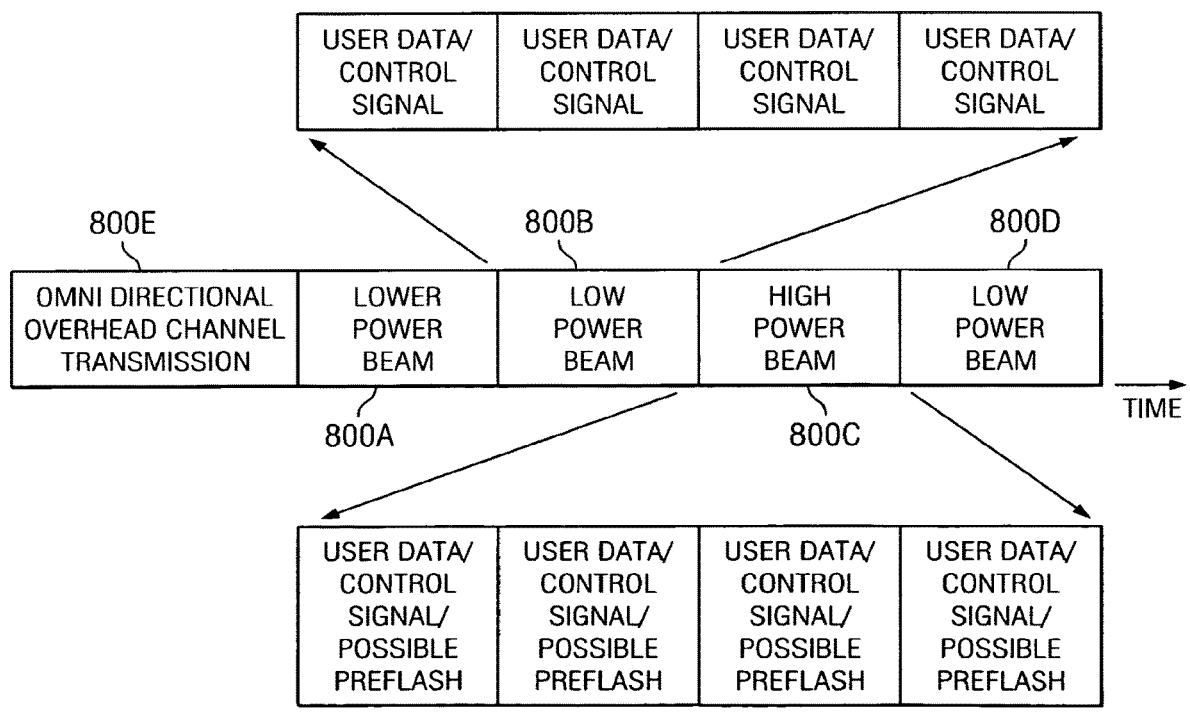

In an alternative implementation, in addition to low-power beams and a high-power beam transmitted in time intervals 800A, 800B, 800C, and 800D, another time interval 800E (FIG. 14) can be allocated to transmit an omni-directional overhead channel. An omni-directional transmission means that the overhead channel is broadcast in all directions of a particular cell sector (or cell). If omni-directional transmission is used, there can be time, space, or frequency coordination among transmissions of the omni-directional overhead channels by different base stations to enhance better signal reception at the mobile station (and to reduce interference between different cells).

In some implementations, OSTMA may be applied to the forward link, but not to the reverse link. In such implementation, if the cell size is designed based on the reach of the forward link, then the forward link may have a further reach (due to presence of the high-power beam) than a mobile station would have in the reverse link. To address this issue, a relaying feature (referred to as "ad hoc relay") can be provided in mobile stations within a cell sector, where one mobile station is able to listen to another mobile station and to relay the information of the other mobile station to the base station. For example, a first mobile station can be located near the edge of a particular cell sector, while a second mobile station is located closer to the base station. In this scenario, information transmitted in the reverse link by the first mobile station can be relayed by the second mobile station to the base station. Without the relay, the transmission from the first mobile station may not be able to reliably reach the base station.

To transmit reverse link information from the first mobile station to the second mobile station for ad hoc relay as discussed above, in a time division duplexing (TDD) system, an unused forward link time slot can be reused for relaying reverse information from the first mobile station to the second mobile station in the reverse link direction.

Also, for more robust communication of control channels when the cell size is designed based on the forward link reach, the mobile station can transmit traffic data to just one base station, but can transmit control channels to multiple base stations using ad hoc relay to ensure that control channels reach the intended serving base station.

Another issue associated with designing cell sizes based on forward link reach is that reverse link control message ACK may be slow in getting back to the base station due to the ad hoc relay as discussed above. To address this issue, the base station can simply transmit bursts of traffic data without waiting for responsive acknowledgments.

Alternatively, the cell size can be designed based on the reach of the reverse link, in which case cell sizes would be smaller. In such an implementation, a base station can reach multiple cells in the forward link; as a result, it may be possible that the serving cell sector for the forward link is different from the serving cell sector for the reverse link. For example, base station A in cell A can be the forward link serving base station, whereas base station B in cell B is the reverse link serving base station. Base station A can reach both cell A and cell B, but a mobile station in cell B can only reach base station B. In this scenario, certain reverse control messages, such as CQI messages or reverse acknowledgment (RACK) messages, can be sent on the reverse link from the mobile station to base station B, which then relays the control messages to base station A (which is the forward link serving base station).

It is noted that certain types of control information may have to be delivered to all mobile stations in all directions. However, since the high-power beam covers just one beam position in any give time interval, the high-power beam cannot be used to transmit such control information to all mobile stations. To address this, such control information can be transmitted by the base station in low-power beams with low code rates (which enables a higher probability decoding of such control information by mobile stations located near the cell edge). Examples of control information that may have to be delivered to all mobile stations in all directions include a forward link acknowledgment channel (to provide acknowledgments to mobile stations) and forward link power control channel (to provide power control messages to mobile stations).

If a dynamic sweep pattern and/or dynamic beam duration is used, which may mean that beam identifiers would have to be provided to mobile stations, the base station can also use low-power beams with low code rates to deliver the beam identifiers to mobile stations located near the cell edge. The beam identifier allows a mobile station to know which next beam will be turned on.

It is noted that in some embodiments, an OSTMA subsystem can be integrated with a non-OSTMA system. A non-OSTMA system does not employ the OSTMA techniques discussed above.

Figure 15:
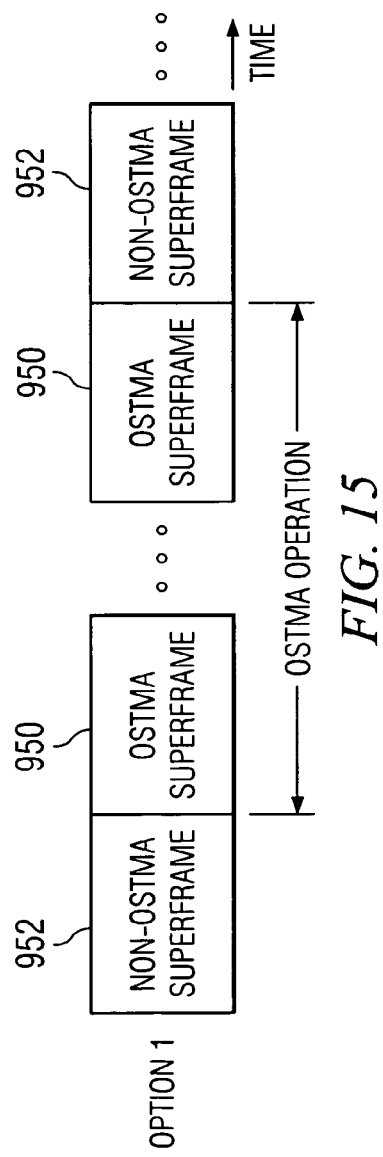
FIGS. 15 and 16 illustrate frame structures for communicating data, according to some preferred embodiments.

In this scenario, interleaving of OSTMA data and non-OSTMA data can be performed over a wireless link. For example, as depicted in FIG. 15, OSTMA superframes 950 are transmitted during an interval associated with OSTMA operation, whereas non-OSTMA superframes 952 are transmitted outside the time periods of OSTMA operation. A "superframe" refers to a frame structure that contains other frames. More generally, reference is made to a "frame," which is a collection of data that is sent over a wireless link.

Figure 16:
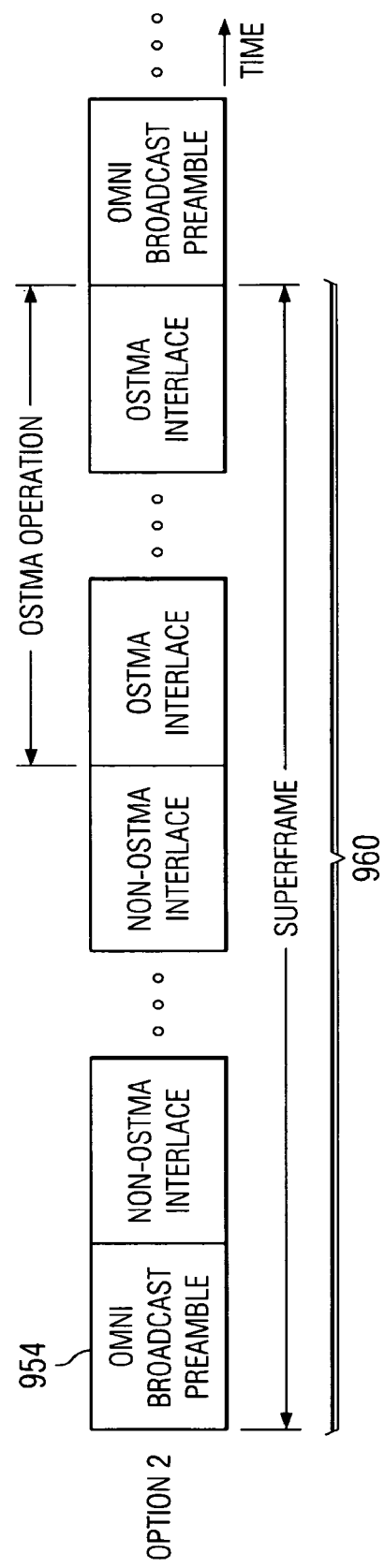

In an alternative embodiment, as depicted in FIG. 16, a superframe 960 can include non-OSTMA data interlaced with OSTMA data. The beginning of the superframe 910 can include an omni-broadcast preamble 954 to indicate positions of non-OSTMA data and OSTMA data. In alternative implementations, other frame structures can be used.

Figure 17:
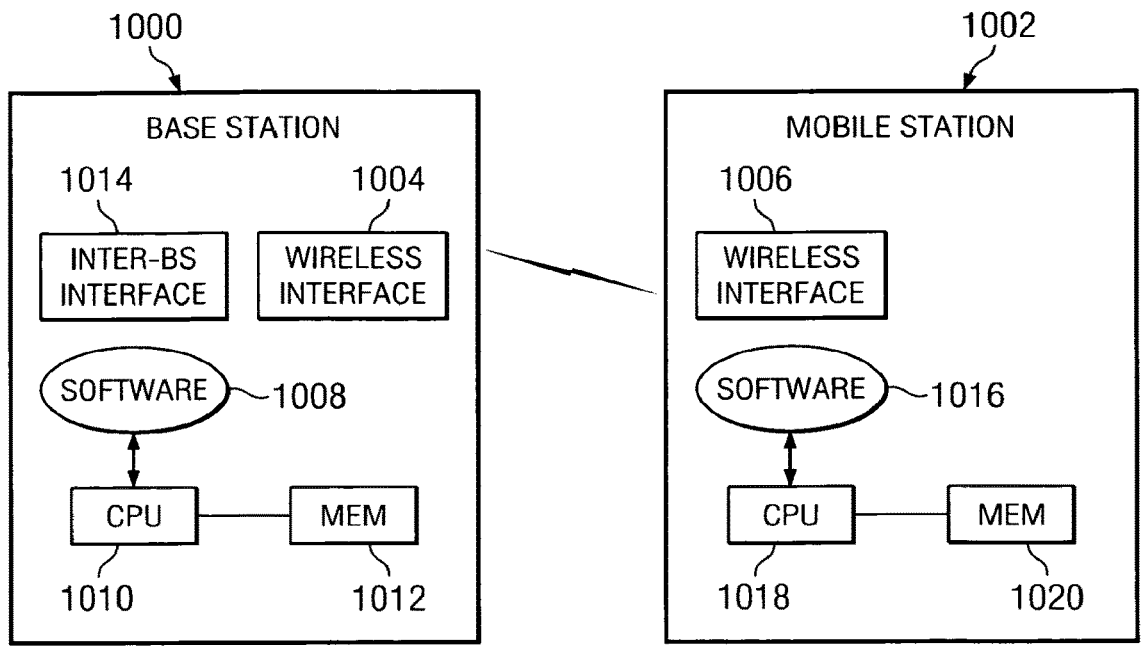
FIG. 17 is a block diagram of exemplary components of a base station and mobile station; and, FIG. 18 is a diagram showing the PHY frames and the pilot indicator channel signal.

Exemplary components of a base station 1000 and mobile station 1002 are depicted in FIG. 17. The base station 1000 includes a wireless interface 1004 to communicate wirelessly over a wireless link with a wireless interface 1006 in the mobile station 1002. The base station 1000 includes software 1008. That is executable on one or more central processing units (CPUs) 1010 in the base station 1000 to perform tasks of the base station. The CPU(s) 1010 is (are) connected to a memory 1012. The software 1008 can include a scheduler and other software modules. The base station 1000 also includes an inter-base station interface 1014 to communicate information with another base station, such as backhaul information and/or coordination information.

Similarly, the mobile station 1002 includes software 1016 executable on one or more CPUs 1018 connected to a memory 1020. The software 1016 is executable to perform tasks of the mobile station 1002. Instructions of such software (1008 and 1016) can be loaded for execution onto the CPUs or other types of processors. The processor can include a microprocessor, microcontroller, processor module or subsystem (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (ERPROMs) and flash memories; magnetic disks such as fixed, floppy and removable disks; other magnetic media including tape; and optical media such as compact disks (CDs) or digital video disks (DVDs).

Figure 18:
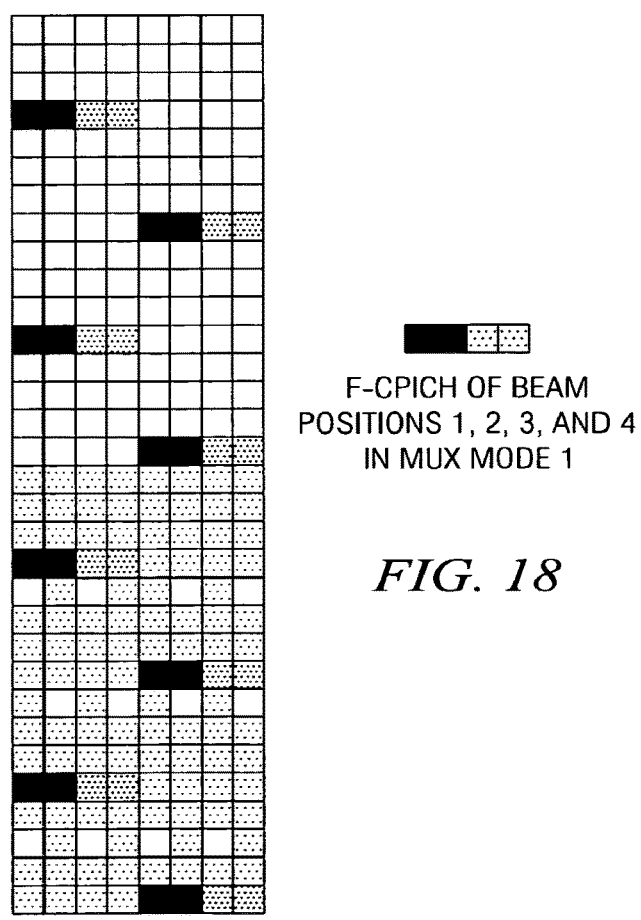

As a further embodiment of the present invention, the channel quality indicator (CQI) is used to support the transmissions, with the CQI being estimated based on a pilot channel indicator signal that is periodically broadcast on the forward link in the PHY frame signaling structure. This embodiment can apply to both multiplexing modes 1 and 2 in the UMB standard for OSTMA systems. Specifically, the CQI is estimated from the F-CPICH common pilot indicator channel signaling for multiplexing mode 1 and DRCH distribution resources zone in multiplexer mode 2, or alternatively from the F-CQIPICH pilot indicator channel signaling in BRCH block resource channel zone of multiplexer mode 2. The F-CPICH or F-CQIPICH pilot indicator channel signaling is beamformed, with one signal per beam, and the F-CPICH or F-CQIPICH pilot indicator channel signaling are transmitted at high powers to make sure cell-edge user see the pilot indicator channel signal from all the beams. The SISO or MIMO transmission protocol is used in each beam for this pilot indicator channel signaling, and an example of the PHY frame using the F-CPICH pilot indicator signaling is shown in FIG. 18. The F-CPICH of beam positions 1, 2, 3, and 4 are indicated by the blocks at 180 shown to be periodically broadcast in the indicated time frames.

In this embodiment, the mobile station 1002 would receive the F-CPICH or F-CQIPICH pilot indicator channel signaling as received from all beamformed transmissions. The mobile station 1002 would determine which beam position corresponds to the high-power beam based on the F-CPICH or F-CQIPICH pilot indicator channel signaling, and the mobile station 1002 would estimate the CQI value from the F-CPICH or F-CQIPICH pilot indicator channel signaling. The mobile station 1002 can also be referred to as an access terminal. The CQI would be estimated and a beam index would be calculated to provide information on the beam position.

The mobile station 1002 would provide feedback to the basestation 1000 in two modes. In the first mode, the mobile station 1002 would feed back the highest CQI value and its corresponding beam position via a beam index (e.g. beam position 1, 2, 3 or 4 in a four beam sector) to the basestation 1000. In the second mode, the mobile station 1002 would feed back the highest two CQI values and two corresponding beam positions via a beam index (e.g. beam position 1 and 2, 2 and 3, etc. in a four beam sector) to the basestation 1000 if the mobile station 1002 determines that it is located in the service area of two overlapping beams. The mobile station 1002 initiates a Layer 3 signaling to trigger the switch between the two modes of providing feedback.

In response to this feedback, the basestation 1000 will schedule communications to be transmitted to the mobile station 1002 based on the beam position index and the CQI value. In the second mode, the basestation 1000 will schedule users so that the high-power beam will not create strong interference to users in the neighboring low-power beams. If the mobile station 1002 is located in the middle of two beams, the basestation 1000 can schedule data transmissions on both overlapping beams. The data on these overlapping beams will occupy the same resource location, and the data will be processed through the same scrambling protocols for both beams. The mobile station 1002 located in the overlapping beam areas will receive the transmissions and monitor the F-SCCH parameter value on the beam position having the highest value CQI, and one bit in the FSCCH parameter will designate the redundant data transmission on two overlapping beam positions.

From the CQI value and/or the beam index information, the basestation 1000 or the mobile station 1002 will determine whether the mobile station 1002 is being served by a high-power or low-power beam. If the basestation 1000 makes that determination, the mobile station 1002 will need to monitor the F-SCCH parameter value for beam position with the highest CQI value for both the high and low power beams.

This approach gives the basestation 1000 more flexibility in scheduling on both high and low power beams, as high power beams can also serve cell-center users. If the mobile station 1002 makes that determination, the mobile station 1002 will feed back a signal bit in a transmission to indicate the choice of low or high power beam or a channel quality indicator (CQI) corresponding to the high power beam and/or beam index information. In this embodiment, significant power savings can be achieved by having the mobile station 1002 monitor the F-SCCH parameter value of the beam position with the highest CQI value for either high or low power beams, especially for cell-edge users. The reported CQI will be adjusted for future transmissions if the mobile station 1002 is served by a low-power beam.

The pilot channel indicators for the CQI measurement can also be transmitted in the high beam only, while the low-power beam transmits a different type of pilot signal for demodulation purposes. In this embodiment, the CQI is only reported when the user receives the high-power beam, or when the estimated CQI exceeds a minimum threshold value. Based on the knowledge of the beam sweeping pattern as communicated by the basestation 1000, the user would know about the timing associated with high beam transmission in the sector. The beam index may not be fed back to the basestation 1000 with the CQI index, as the basestation 1000 may derive the beam coverage for the user based on the quality of the beam transmission and the timing associated with the CQI feedback.

In another embodiment, a forward link (FL) control channel signal is transmitted using different signals and methods, which assists with the location of the best suited beam for transmissions with the mobile station 1002. In one approach, the DRCH distribution resource zone signal in multiplexer mode 2 will transmit the FL control signals. Because of the limited number of users in each beam, a single or multiple DRCH signals could be used per beam to control signaling. The control DRCH signal could be transitioned to hop randomly around the sector to minimize collisions with neighboring beams. The control channel in the low-power beam will be on low-power, and the control channel in the high-power beam will be on high power.

In a second approach, the FL control channel signal is transmitted using the F-SCCH parameter, and access grant is sent in the high power beam. The mobile station 1002 monitors the F-SCCH parameter value for the high-power beam designation. In a third approach, the F-ACKCH parameter is used to transmit the FL control channel signal. In this approach, a few tones of the ACK signal are transmitted in high power on the low power beam so the cell-edge users can be reached.

In a fourth approach, the F-PCCH and F-PQICH signals can be used to send the FL control channel signal, and those signals may be sent on the high-beam position corresponding to the location of the mobile station 1002. The transmission may be adjusted if the mobile station 1002 moves from one beam position to another beam position. In the Ultra Mobile Broadband protocol, the F-PCCH is typically sent every eight frames and the F-PQICH is sent every 16 frames.

In a fifth approach, the F-FOSICH and F-IOTCH signals can be used to send the FL control signal. These signals may be transmitted by the high-power beam and the mobile station 1002 receives these F-FOSICH and F-IOTCH signals every four frames. Or, in the alternative, these signals may be transmitted by all beams and allows a few tones of the FOSICH and IOTCH signals to be transmitted in high power in the low power beam so the cell-edge users can be reached. In the Ultra Mobile Broadband protocol, the F-FOSICH is typically broadcast in every frame, and the F-IOTCH can be broadcast as fast as every frame.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for operating a receiver, the method comprising:
    by the receiver:
        receiving pilot channel indicator signals from an access node corresponding to a plurality of spatial beams, wherein each of the pilot channel indicator signals is transmitted in a beamformed fashion on one of the plurality of spatial beams;
        exchanging layer 3 signaling, wherein the layer 3 signaling indicates a feedback mode;
        generating a feedback signal based on the layer 3 signaling, wherein:
            when the feedback mode is a first mode, said feedback signal includes a first beam index, wherein the first beam index corresponds to the pilot channel indicator signal of the first beam among the plurality of spatial beams; and
            when the feedback mode is a second mode, said feedback signal includes two beam indices corresponding to two pilot channel indicator signals of two spatial beams among the plurality of spatial beams, wherein the second mode facilitates transmission to the receiver on the two spatial beams simultaneously;
        transmitting said feedback signal to the access node from the first receiver;
        receiving a transmission from the access node, the transmission at least in part based on an analysis of the feedback signal.

2. The method of claim 1, wherein said receiving the transmission from the access nodes comprises receiving the transmission on only one of the plurality of spatial beams.

3. The method of claim 1, wherein said receiving the transmission from the access nodes comprises receiving the transmission on the two spatial beams of the plurality of spatial beams.

4. The method of claim 3, wherein the transmission on the two spatial beams of the plurality of spatial beams is a single set of data transmitted from both beams in the same resource location.

5. The method of claim 1, wherein, in the second mode, a control channel received from the access node comprises an indication that the transmission is on two spatial beams.

6. The method of claim 1, wherein a control channel is received over one or more of the spatial beams.

7. The method of claim 1, wherein the plurality of spatial beams are transmitted using an antenna panel of the access node, and wherein the antenna panel comprises antenna elements of different polarizations.

8. An apparatus, comprising:
    one or more processors, wherein the one or more processors are configured to cause a receiver to:
        receive pilot channel indicator signals from an access node corresponding to a plurality of spatial beams, wherein each of the pilot channel indicator signals is transmitted in a beamformed fashion on one of the plurality of spatial beams;
        generate a feedback signal based on layer 3 signaling, wherein the layer 3 signaling indicates a feedback mode, wherein:
            when the feedback mode is a first mode, said feedback signal includes a first beam index, wherein the first beam index corresponds to the pilot channel indicator signal of the first beam among the plurality of spatial beams; and
            when the feedback mode is a second mode, said feedback signal includes two beam indices corresponding to two pilot channel indicator signals of two spatial beams among the plurality of spatial beams, wherein the second mode facilitates transmission to the receiver on the two spatial beams simultaneously;
        transmit said feedback signal to the access node from the first receiver;
        receive a transmission from the access node, the transmission at least in part based on an analysis of the feedback signal.

9. The apparatus of claim 8, wherein said receiving the transmission from the access nodes comprises receiving the transmission on only one of the plurality of spatial beams.

10. The apparatus of claim 8, wherein said receiving the transmission from the access nodes comprises receiving the transmission on the two spatial beams of the plurality of spatial beams.

11. The apparatus of claim 8, wherein the transmission on the two spatial beams of the plurality of spatial beams is a single set of data transmitted from both beams in the same resource location.

12. The apparatus of claim 8, wherein, in the second mode, a control channel received from the access node comprises an indication that the transmission is on two spatial beams.

13. The apparatus of claim 8, wherein a control channel is received over one or more of the spatial beams.

14. The apparatus of claim 8, wherein the plurality of spatial beams are transmitted using an antenna panel of the access node, and wherein the antenna panel comprises antenna elements of different polarizations.

15. A non-transitory computer accessible memory medium storing program instructions executable by a processor to:
receive pilot channel indicator signals from an access node corresponding to a plurality of spatial beams, wherein each of the pilot channel indicator signals is transmitted in a beamformed fashion on one of the plurality of spatial beams;
generate a feedback signal based on layer 3 signaling, wherein the layer 3 signaling indicates a feedback mode, wherein:
when the feedback mode is a first mode, said feedback signal includes a first beam index, wherein the first beam index corresponds to the pilot channel indicator signal of the first beam among the plurality of spatial beams; and
when the feedback mode is a second mode, said feedback signal includes two beam indices corresponding to two pilot channel indicator signals of two spatial beams among the plurality of spatial beams, wherein the second mode facilitates transmission to the receiver on the two spatial beams simultaneously;
transmit said feedback signal to the access node from the first receiver;
receive a transmission from the access node, the transmission at least in part based on an analysis of the feedback signal.

16. The non-transitory computer accessible memory medium of claim 15, wherein said receiving the transmission from the access nodes comprises receiving the transmission on only one of the plurality of spatial beams.

17. The non-transitory computer accessible memory medium of claim 15, wherein said receiving the transmission from the access nodes comprises receiving the transmission on the two spatial beams of the plurality of spatial beams.

18. The non-transitory computer accessible memory medium of claim 15, wherein the transmission on the two spatial beams of the plurality of spatial beams is a single set of data transmitted from both beams in the same resource location.

19. The non-transitory computer accessible memory medium of claim 15, wherein, in the second mode, a control channel received from the access node comprises an indication that the transmission is on two spatial beams.

20. The non-transitory computer accessible memory medium of claim 15, wherein a control channel is received over one or more of the spatial beams.

* * * * *